United States Patent
Shin (10) Patent No.: US 8,944,667 B2
(45) Date of Patent: Feb. 3, 2015

(54) LIGHT EMITTING MODULE AND DISPLAY DEVICE HAVING THE SAME

(75) Inventor: Kyung Ho Shin, Gwangju (KR)

(73) Assignee: LG Innotek Co., Ltd., Seoul (KR)

( * ) Notice: Subject to any disclaimer, the term of this patent is extended or adjusted under 35 U.S.C. 154(b) by 645 days.

(21) Appl. No.: 12/700,021

(22) Filed: Feb. 4, 2010

(65) Prior Publication Data

US 2010/0208491 A1    Aug. 19, 2010

(30) Foreign Application Priority Data

Feb. 17, 2009  (KR) ........................ 10-2009-0013164

(51) Int. Cl.
*F21V 15/01*    (2006.01)
*F21V 8/00*     (2006.01)

(52) U.S. Cl.
CPC .................................. *G02B 6/0091* (2013.01)
USPC ............................ 362/634; 362/633; 362/632

(58) Field of Classification Search
USPC ........ 362/634, 633, 632, 613, 581, 612, 97.2, 362/561, 97.3
See application file for complete search history.

(56) References Cited

U.S. PATENT DOCUMENTS

| | | | |
|---|---|---|---|
| 6,508,564 B1 | 1/2003 | Kuwabara et al. | |
| 6,910,784 B2* | 6/2005 | Ito ................................ | 362/632 |
| 7,021,813 B2* | 4/2006 | Lee et al. ....................... | 362/609 |
| 7,578,610 B2* | 8/2009 | Sakamoto et al. ............. | 362/634 |
| 7,611,274 B2* | 11/2009 | Hsiao et al. .................... | 362/634 |
| 7,744,265 B2* | 6/2010 | Kang et al. ..................... | 362/633 |
| 2005/0246927 A1 | 11/2005 | Krawinkel | |
| 2006/0018131 A1* | 1/2006 | Kim ................................ | 362/634 |
| 2007/0008739 A1* | 1/2007 | Kim et al. ....................... | 362/612 |
| 2007/0171673 A1* | 7/2007 | Song et al. ..................... | 362/612 |
| 2008/0049444 A1 | 2/2008 | Hsiao et al. | |
| 2008/0186732 A1 | 8/2008 | Awai et al. | |
| 2010/0085774 A1 | 4/2010 | Park | |

FOREIGN PATENT DOCUMENTS

| | | |
|---|---|---|
| CN | 1920644 A | 2/2007 |
| CN | 101075609 A | 11/2007 |
| KR | 10-2004-0082132 | 9/2004 |
| KR | 10-2007-0051079 | 5/2007 |
| KR | 10-2008-0095738 | 10/2008 |
| KR | 10-2009-0077125 | 7/2009 |
| KR | 10-2009-0104521 | 10/2009 |
| WO | WO 2006/132039 | 12/2006 |
| WO | WO 2006/137660 | 12/2006 |

OTHER PUBLICATIONS

European Search Report issued in EP Application No. 10153417.0 dated May 31, 2010.
Chinese Office Action dated Aug. 14, 2013.
Chinese Office Action issued in related Application No. 201010108078.7 dated Jul. 28, 2014.

* cited by examiner

*Primary Examiner* — Sharon Payne
(74) *Attorney, Agent, or Firm* — KED & Associates, LLP (57) ABSTRACT

A light emitting module and a display device including the light emitting module are provided. The light emitting module may include a metal plate, a board, and a plurality of light emitting diodes. The board may be attached to a side surface of the metal plate, and light emitting diodes may be arranged on the board.

19 Claims, 8 Drawing Sheets

LIGHT EMITTING MODULE AND DISPLAY DEVICE HAVING THE SAME

CROSS-REFERENCE TO RELATED APPLICATIONS

This claims priority under 35 U.S.C. 126 and 35 U.S.C. 365 to Korean Patent Application No. 10-2009-0013164 (filed in Korea on Feb. 17, 2009), the entirety of which is incorporated herein by reference.

BACKGROUND

1. Field

This relates to a light emitting module and a display device having the light emitting module.

2. Background

Display devices may include a cathode ray tube (CRT), a liquid crystal display device (LCD), a plasma display panel (PDP), and an electro luminescent display (ELD). Many LCDs may be light receiving devices that display an image by controlling an amount of light incident from the outside. Thus, a backlight assembly may be used to irradiate light onto a liquid crystal panel.

BRIEF DESCRIPTION OF THE DRAWINGS

The embodiments will be described in detail with reference to the following drawings in which like reference numerals refer to like elements wherein.

DETAILED DESCRIPTION

Reference will now be made in detail to various embodiments, examples of which are illustrated in the accompanying drawings. In description of embodiments, it will be understood that in a case where a layer (or sheet), a region, a pattern, or components are referred to as being 'on' or 'under' another substrate, layer (or film), region or patterns, the 'on' and 'under' include all the meanings of 'directly' and 'indirectly'. Further, reference to 'on' and 'under' each layer will be made on the basis of drawings. Also, the thickness of each layer in the drawings is exemplary, and is not limited thereto.

Figure 1:
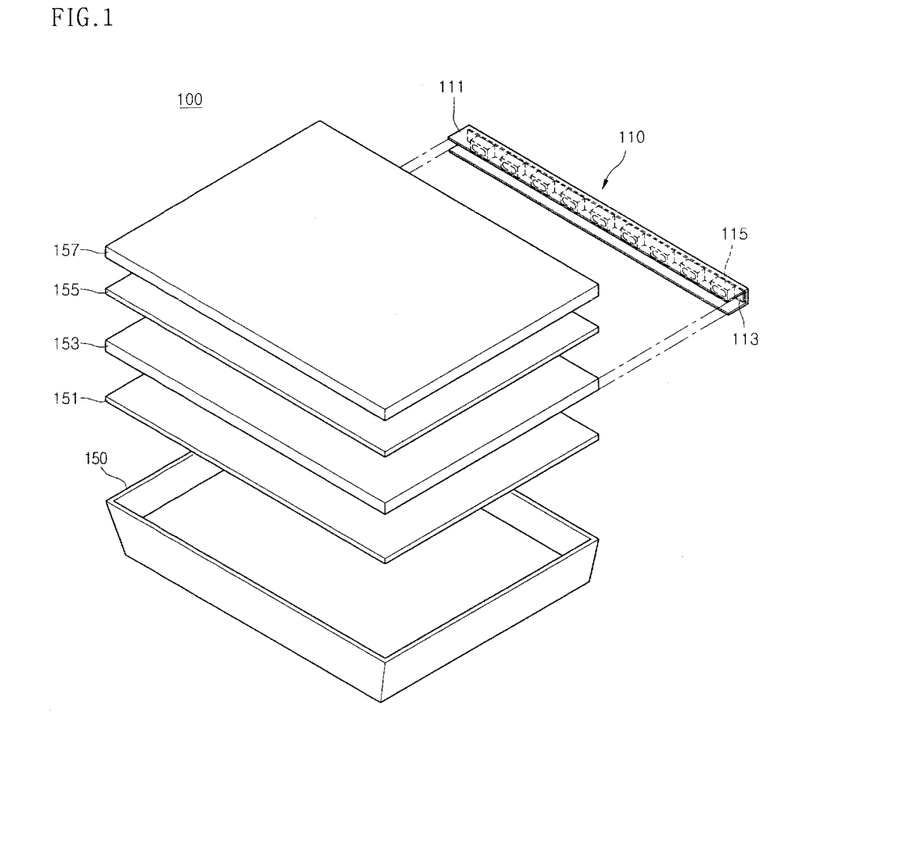
FIG. 1 is a perspective view of a display device according to an embodiment as broadly described herein.

As shown in FIG. 1, a display device 100 as embodied and broadly described here in may include a light emitting module 110, a cover 150, a reflective plate 151, a light guide plate (or light guide panel, LGP) 153, an optical sheet 155, and a display panel 157.

The light emitting module 110 may include a metal plate 111, a board 113, and a plurality of light emitting diodes 115. The metal plate 111 may be formed of aluminum or stainless steel material. The board 113 may include a typical PCB or a metal core PCB. The board 113 may be thermally compressed and attached to the front surface of the metal plate 111 without using a tape, an adhesive, a screw or other type of attachment device. The rear surface of the board 113 may be deformed by thermal heating, or may be deformed to have a greater width so that the rear surface of the board 113 may be in direct contact with the front surface of the metal plate 111. When a plurality of holes are provided in the metal plate 111, portions of the rear surface of the board 113 may be inserted into the holes to increase an attaching force therebetween. The board 113 may be positioned on a front surface of the metal plate 111 and have a long bar shape that faces the light guide plate 153.

A predetermined circuit pattern may be provided on the front surface of the board 113. The light emitting diodes 115 may be arranged on the front surface of the board 113. The light emitting diodes 115 may be spaced apart by a predetermined distance from each other in at least one line. Other arrangements may also be appropriate.

The light emitting diodes 115 may be installed in a package shape. A package may include at least one LED chip and a fluorescent material, or a plurality of LED chips, to emit a target light (such as, for example, white light). Other arrangements may also be appropriate. A surface of the light emitting diodes 115 opposite a light emitting surface thereof may be disposed on the board 113.

The board 113 may be compressed onto the metal plate 111 so as to be uniformly attached to the surface of the metal plate 111, and heat generated by the board 113 and the light emitting diodes 115 may be emitted by the metal plate 111. Accordingly, heat generated by the light emitting module 110 may be effectively dissipated.

The cover 150 may define a recess having inclined side walls extending form the outer peripheral edge of the bottom surface of the cover 150. Other arrangements may also be appropriate. The light emitting module 110 and the light guide plate 153 may be positioned in the recess of the cover 150.

The light guide plate 153 may be positioned on a light emitting surface of the light emitting module 110. The reflective plate 151 may be positioned under the light guide plate 153. The optical sheet 155 may be positioned over the light guide plate 153.

The light guide plate 153 may be formed of poly carbonate (PC) material, a poly methy methacrylate (PMMA) material, or other material as appropriate. A reflective pattern may be provided on a lower portion of the light guide plate 153.

Light emitted by the light emitting diodes 115 of the light emitting module 110 is incident on the light guide plate 153. The light guide plate 153 guides light emitted by the light emitting diodes 115 to the entire region so as to emit the light as a surface light source.

The reflective plate 151 reflects light leaking to the lower side of the display panel 153. The optical sheet 155 emits light incident thereon from the light guide plate 153 in a uniform brightness distribution.

The optical sheet 155 may include at least one of a spread sheet, a horizontal and vertical prism sheet, a brightness improving sheet, or other type of sheet as appropriate. The spread sheet spreads incident light. The horizontal and vertical prism sheet collects incident light into a display region. The brightness improving sheet collects lost light to improve brightness. The optical sheet 155 may function as at least one of these sheets configured to spread, refract, reflect, and diffuse incident light.

The display panel 157 may be, for example, an LCD panel that includes first and second transparent substrates facing each other, with a liquid crystal layer disposed between the first and second substrates. A polarizer plate may be attached to at least one surface of the display panel 157 in an appropriate manner. The display panel 157 displays information by light passing through the optical sheet 155.

The display device 100 shown in FIG. 1 may be applied to, for example, portable terminals, monitors of notebook computers and laptop computers, televisions, and other such devices.

A process of fabricating a light emitting module as embodied and broadly described herein will now be discussed with reference to FIGS. 2-7.

Figure 2:
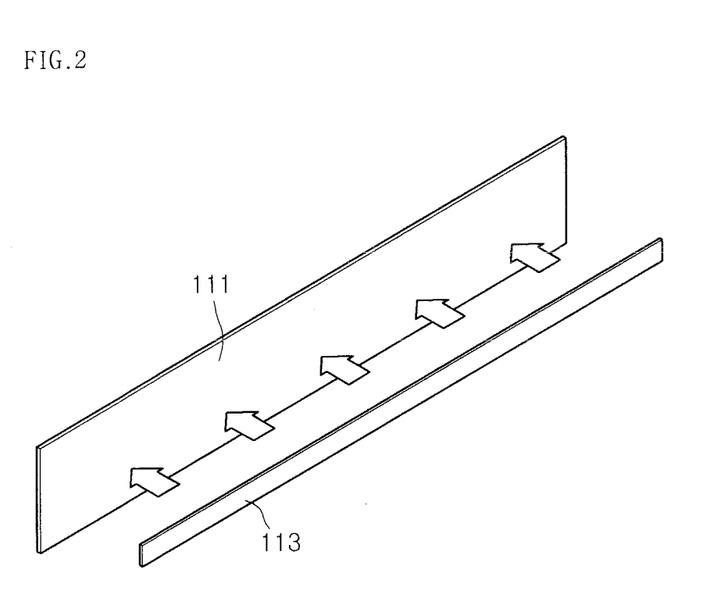
FIGS. 2 to 7 illustrate a process of fabricating the light emitting module shown in FIG. 1.

Referring to FIG. 2, the board 113 is positioned at the front surface of the flat metal plate 111, and then, at least one of the metal plate 111 or the board 113 is heated to a predetermined temperature to thermally compress the board 113 to the metal plate 111. The metal plate 111 may be formed of, for example, an aluminum or stainless steel material, or other material as appropriate. The board 113 may include a typical PCB or a metal core PCB. A predetermined circuit pattern may be provided on the board 113. Since the board 113 is thermally compressed and attached to the front surface of the metal plate 111, a tape, an adhesive member, a screw or other type of attachment device is not required, thus simplifying this process of the manufacturing process. When a plurality of holes are provided in the metal plate 111, portions of the board 113 may protrude through the holes. Accordingly, the board 113 may be more firmly fixed to the front surface of the metal plate 111.

Figure 3:
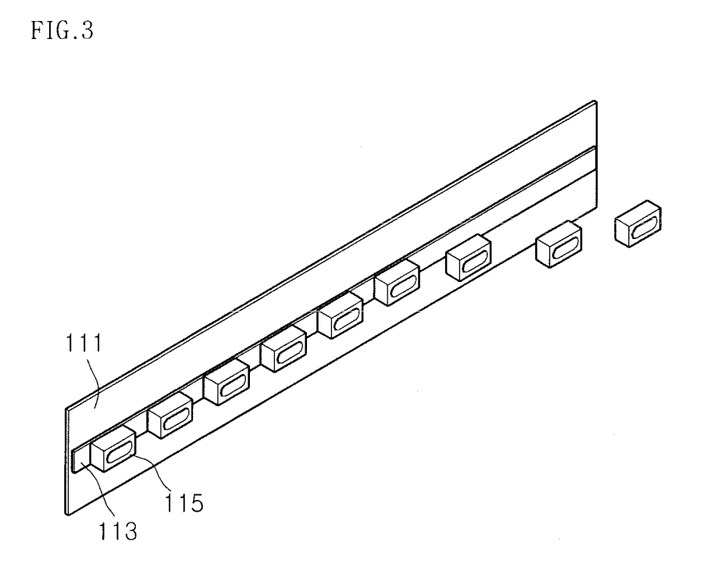
Figure 4:
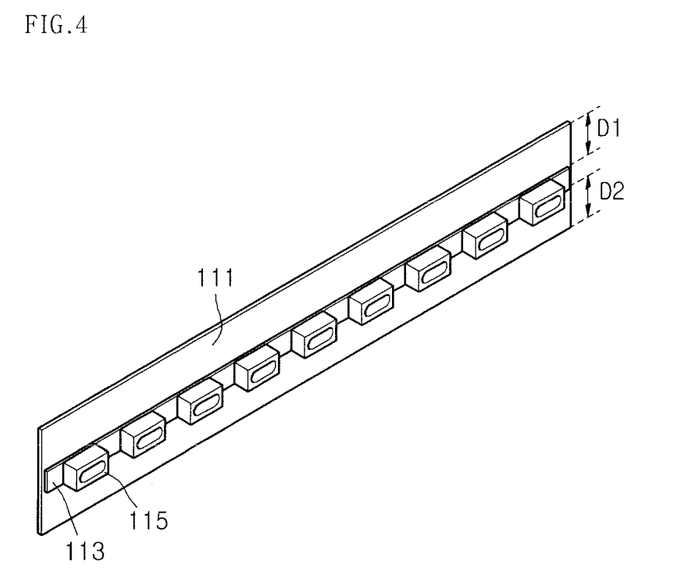

Referring to FIGS. 3 and 4, after the board 113 is attached to the front surface of the metal plate 111, the light emitting diodes 115 may be installed on the front surface of the board 113. The light emitting diodes 115 may be spaced apart by a constant distance or by different distances from each other in at least one line on the front surface of the board 113. Other arrangements may also be appropriate. Each light emitting diode 115 may include at least one colored LED such as, for example, a blue LED, a white LED, a green LED, or a red LED. The light emitting diodes 115 may be installed on the board 113 in a chip on board manner, a package on board manner, or other manner as appropriate.

An upper width D1 of the plate 111 above the light emitting diodes 115 and a lower width D2 of the metal plate 111 below the light emitting diodes 115 may be the same or different.

Figure 5:
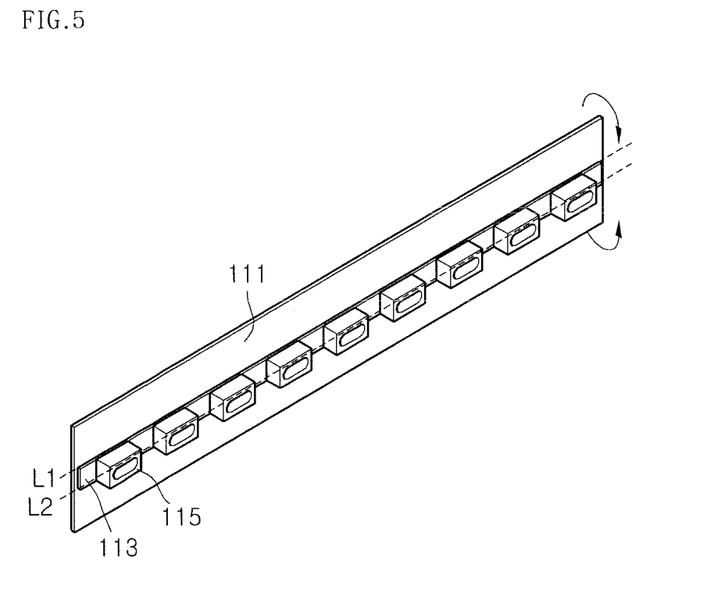
Figure 6:
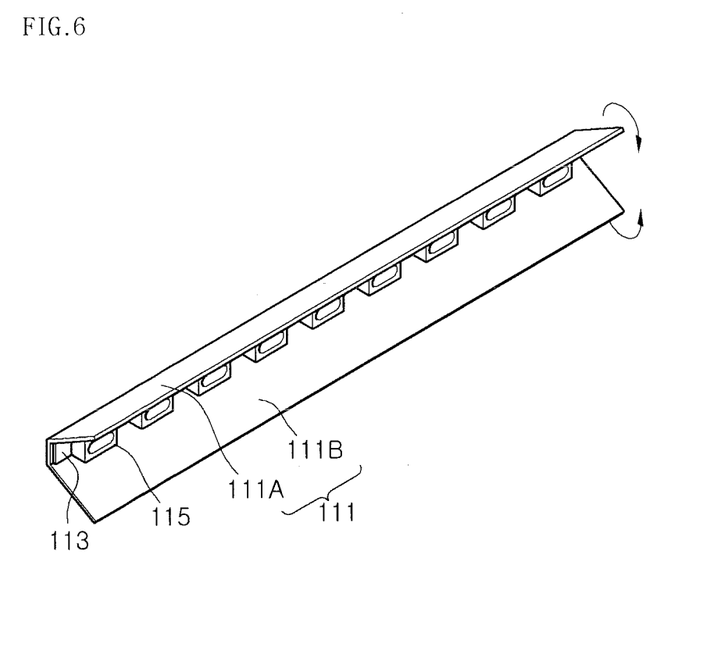
Figure 7:
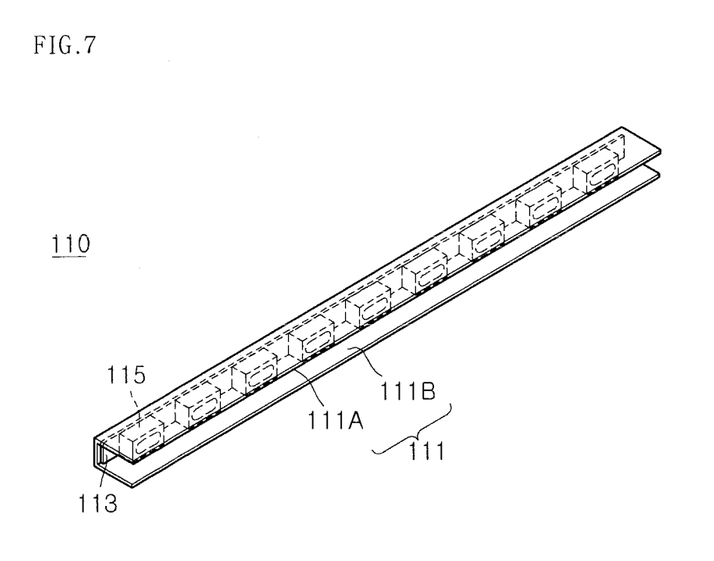

Referring to FIGS. 5 and 6, the front upper/lower portions of the metal plate 111 may be separated by boundary lines L1 and L2 defined by upper and lower edges the board 113, respectively. Then, along the boundary lines L1 and L2, the upper and lower portions of the metal plate 111 may be bent forward as illustrated in FIG. 6. Thus, an upper portion 111A and a lower portion 111B of the metal plate 111 may be bent so as to face each other as illustrated in FIG. 7. The distance between the boundary lines L1 and L2 may be substantially equal to the width of the board 113, or the thickness of the light guide plate 153, or the sum of the thickness of the light guide plate 153 and the thickness of an inserted sheet.

The upper portion 111A and the lower portion 111B of the metal plate 111 may face each other on the upper and lower sides of the board 113, and may reflect light emitted by the light emitting diodes 115 to guide the light forward. The upper portion 111A and the lower portion 111B of the metal plate 111 may protrude along the length of the metal plate 111 so as to cover extension lines at orientation angles of the light emitting diodes 115, and thus reflect light emitted by the light emitting diodes 115 at a maximum orientation angle from the light emitting diodes 115. The upper portion 111A and the lower portion 111B of the metal plate 111 may also dissipate heat generated by the board 113 and surroundings thereof.

Figure 8:
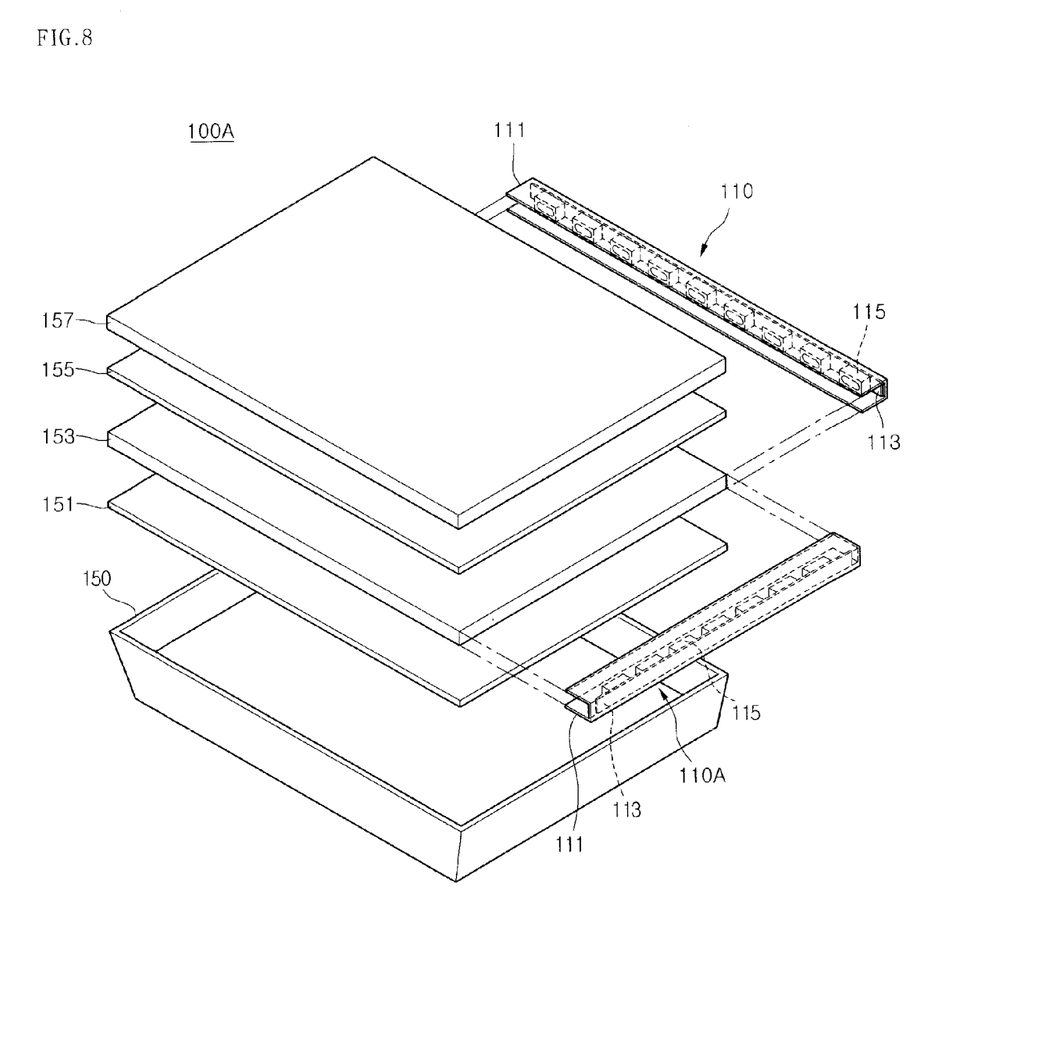
FIG. 8 is a perspective view of a display device according to another embodiment as broadly described herein.

FIG. 8 is a perspective view of a display device according to another embodiment as broadly described herein. In this embodiment, whenever possible like reference numerals will be used to denote like elements, and further detailed description thereof will be omitted.

Referring to FIG. 8, a display device 100A may include light emitting modules 110 and 110A provided at adjacent/neighboring side surfaces of the light guide plate 153. The light emitting modules 110 and 110A may be provided along a long axis direction and a short axis direction of the light guide plate 153, respectively. This arrangement may correct for uneven brightness distribution due to the size of the light guide plate 153.

Figure 9:
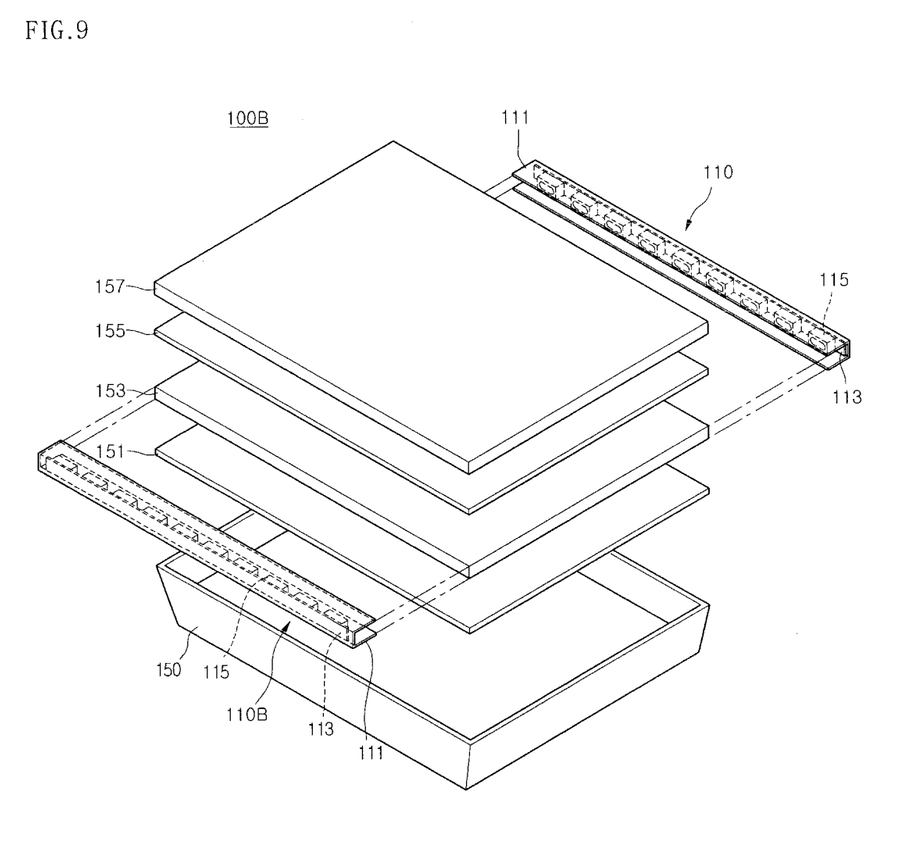
FIG. 9 is a perspective view of a display device according to another embodiment as broadly described herein.

FIG. 9 is a perspective view of a display device according to another embodiment as broadly described herein. In this embodiment, like reference numerals will be used to denote like elements, and further detailed description thereof will be omitted.

Referring to FIG. 9, a display device 100B may include light emitting modules 110 and 110B on two opposite sides of the light guide plate 153. Both of the light emitting modules 110 and 110B may be positioned along the long axis direction, or both along the short axis direction of the light guide plate 153. This arrangement may improve brightness and color distribution.

In a display device as embodied and broadly described herein, light emitting modules may be provided on at least two side surfaces of the light guide plate 153. Other arrangements may also be appropriate.

Figure 10:
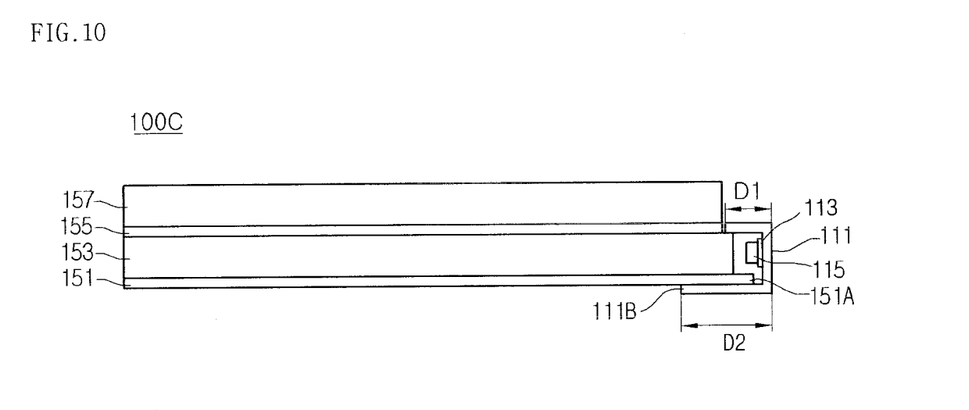
FIG. 10 is a cross-sectional view of a coupling of a light emitting module according to an embodiment as broadly described herein.
Figure 11:
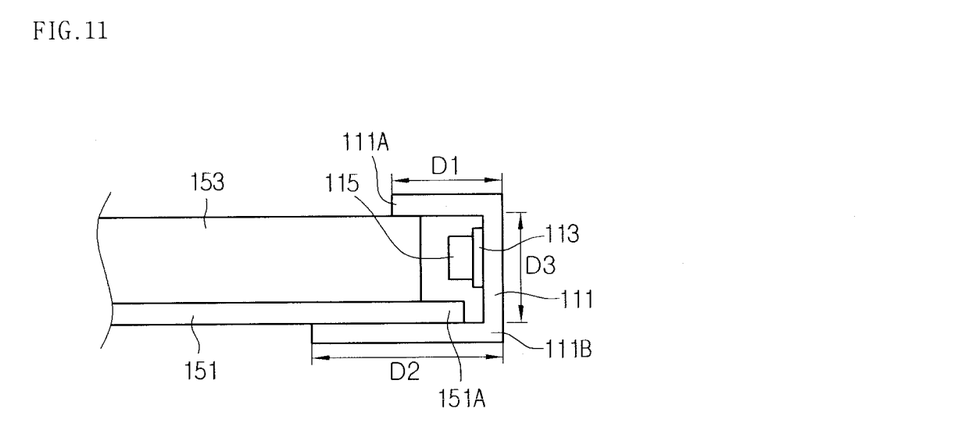
FIG. 11 is a partial enlarged view of FIG. 10.

FIGS. 10 and 11 are cross-sectional views of a coupling of a light emitting module according to an embodiment as broadly described herein.

In the display device 100C shown in FIGS. 10 and 11, a portion of the light guide plate 153 and a portion of the reflective plate 151 may be inserted into the metal plate 111. In certain embodiments, the width D2 of the lower portion 111B of the metal plate 111 may be greater than the width D1 of the upper portion 111A. A middle width D3 of the metal plate 111 may be greater than or equal to the width of the board 113. The reflective plate 151 may be positioned between the lower portion 111B of the metal plate 111 and the light guide plate 153, and an end 151a of the reflective plate 151 may be closer to the board 113 than the light guide plate 153.

More specifically, the reflective plate 151 may be positioned under the light guide plate 153, and the end 151A of the reflective plate 151 may extend to the lower side of the board 113, thus preventing leakage of light emitted by the light emitting diodes 115. The metal plate 111 is positioned at upper and lower sides and the rear surface of the board 113 so as to effectively dissipate heat generated by the light emitting module.

A light emitting module in which a board including light emitting diodes is attached to a metal plate, and a display device having the light emitting module, are provided.

A light emitting module in which a board including light emitting diodes is attached between upper and lower portions of a metal plate, and a display device having the light emitting module, are provided.

A light emitting module as embodied and broadly described herein may include a metal plate; a board attached to a side surface of the metal plate; and a plurality of light emitting diodes arrayed on the board.

A display device as broadly described herein may include a light emitting module as embodied and broadly described herein may include a board attached to a side surface of a metal plate; and a plurality of light emitting diodes arrayed on the board; a light guide plate on a side of the light emitting module; and a display panel on the light guide plate.

A method of fabricating a light emitting module according to an embodiment as broadly described herein may include thermally compressing a board to the front center of a metal plate, installing a plurality of light emitting diodes on the board, and bending both sides of the front surface of the metal plate forward using the board as a boundary.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that various other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A light emitting module, comprising:
a holder, comprising a mounting surface positioned between a first guide surface and a second guide surface, wherein the mounting surface extends in a longitudinal direction of the holder, and wherein the first and second guide surfaces are inclined with respect to the mounting surface such that the first and second guide surfaces face each other and form a receiving space with the mounting surface;
a board coupled to the mounting surface of the holder; and
a plurality of light emitting diodes (LEDs) mounted on a surface of the board facing the receiving space, wherein the receiving space is configured to receive a light guide plate and a reflective plate therein so as to enclose the plurality of LEDs in the receiving space,
wherein the first and second guide surfaces of the holder guide light emitted by the plurality of light emitting diodes in a predetermined direction,
wherein the first and second guide surfaces extend beyond an emitting end of the plurality of light emitting diodes, and
wherein the holder includes a plurality of holes in the mounting surface thereof, and a protrusion of a rear surface of the board is inserted into the plurality of holes of the holder,
wherein the rear surface of the board is in direct contact with the mounting surface of the holder, and the protrusion of the rear surface of the board protrudes through the plurality of holes formed in the holder,
wherein the board is a PCB having a circuit pattern, and the holder is formed of a metal plate,
wherein an end portion of the reflective plate received in the receiving space is positioned between a corresponding end portion of the light guide plate and the second guide surface, the reflective plate including a first portion that vertically overlaps the light guide plate, a second portion that vertically overlaps the second guide surface of the holder, and a third portion between the first and second portions that vertically overlaps both the light guide plate and the second guide surface,
wherein the mounting surface of the holder is physically separated from the reflective plate,
wherein the second guide surface of the holder contacts an outer facing surface of the second portion of the reflective plate and is located at a lower position than the outer facing surface of the second portion of the reflective plate,
wherein the first and second guide surfaces of the holder have different lengths.

2. The light emitting module of claim 1, wherein the second guide surface extends further outward from the mounting surface than the first guide surface does, and wherein a portion of the second guide surface is disposed on a lower surface of the light guide plate.

3. The light emitting module of claim 1, wherein the holder is formed of stainless steel or aluminum.

4. The light emitting module of claim 1, wherein each of the plurality of light emitting diodes has a coupling surface that is coupled to the board and a light emitting surface that is opposite the coupling surface.

5. The light emitting module of claim 1, wherein a distance between the first guide surface and the second guide surface is greater than or equal to a width of the board, wherein a width of the mounting surface of the holder is greater than or equal to the width of the board.

6. The light emitting module of claim 5, wherein an entire surface of the first guide surface of the metal plate is formed in a flat surface and an entire surface of the second guide surface of the boarder is formed in a flat surface, wherein the distance between the first guide surface and the second guide surface is greater than or equal to the width of the mounting surface of the holder.

7. The light emitting module of claim 1, wherein the reflective plate is not contacted with the mounting surface of the holder.

8. The light emitting module of claim 1, wherein the board is located at a higher position than an entire region of the first guide surface of the holder.

9. The light emitting module of claim 8, wherein the board is located at a lower position than an entire region of the second guide surface of the holder.

10. The light emitting module of claim 1, wherein the first and second guide surfaces are bent from the mounting surface in a substantially orthogonal direction, wherein the holder is formed of a different material from the reflective plate.

11. A display device, comprising:
a light guide plate;
at least one light emitting module positioned at a side edge of the light guide plate, the at least one light emitting module comprising:
a holder having a mounting surface and first and second guide surfaces extending from opposite edges of the mounting surface and inclined so as to face each other, wherein the side edge of the light guide plate directly contacts the first guide surface;
a board attached to the mounting surface of the holder;
a reflective plate positioned under the light guide plate, wherein an outer peripheral portion of the reflective plate is positioned between the light guide plate and the second guide surface of the holder, and wherein an outer peripheral edge of the reflective plate is closer to the board than a corresponding outer peripheral edge of the light guide plate is, a plurality of light emitting diodes arranged on the board; and a display panel provided on the light guide plate, wherein the first and second guide surfaces of the holder guide light emitted by the plurality of light emitting diodes in a predetermined direction, and wherein the plurality of LEDs have a coupling surface coupled to a receiving surface of the board and an emitting surface opposite the coupling surface, and wherein the first and second guide surfaces extend beyond an emitting end of the plurality of LEDs, and wherein the holder includes a plurality of holes in the mounting surface and a protrusion of a rear surface of the board is inserted into the plurality of holes of the holder, wherein the rear surface of the board is in direct contact with the mounting surface of the holder, and the protrusion of the rear surface of the board protrudes through the plurality of holes formed in the holder, wherein the board is a PCB having a circuit pattern, and the holder is formed of a metal plate, wherein a length of the second guide surface of the holder is greater than a length of the first guide surface of the holder, and wherein the first and second guide surfaces guide light emitted by the plurality of LEDs to the light guide plate, wherein the outer peripheral portion of the reflective plate vertically overlaps the second guide surface of the holder, wherein the mounting surface of the holder is physically separated from the reflective plate, wherein the second guide surface directly contacts an outer facing surface of the outer peripheral portion of the reflective plate and is located at a lower position than the outer facing surface of the outer peripheral portion of the reflective plate, wherein the first and second guide surfaces of the holder extend to different lengths from the mounting surface in a direction substantially orthogonal to the longitudinal direction.

12. The display device of claim 11, further comprising at least one optical sheet provided between the light guide plate and the display panel.

13. The display device of claim 11, wherein the at least one light emitting module comprises a first light emitting module positioned at a first side edge of the light guide plate, and a second light emitting module positioned at a second side edge of the light guide plate.

14. The display device of claim 11, wherein a distance between the first guide surface and the second guide surface is substantially equal to a sum of a thickness of the light guide plate and a thickness of the reflective plate.

15. A light emitting module, comprising:

a plate made of metal and having a first section and a second section separated by a mounting section, wherein the plate is bent at upper and lower edges of the mounting section such that the first and second sections each extend away from the mounting section in a predetermined direction, and wherein the first section is configured to directly contact a light guide plate;

a board attached to the mounting section; and a plurality of light emitting diodes arranged on the board so as to be positioned between the first and second sections of the plate such that light emitted by the light emitting diodes is guided in the predetermined direction in which the first and second sections extend, wherein the plurality of LEDs have a coupling surface coupled to the board and an emitting section of the plate opposite the coupling surface, and wherein the first and second sections extend beyond an emitting end of the plurality of LEDs, and wherein the plate includes a plurality of holes in the mounting section and a protrusion of the board is inserted into the plurality of holes of the plate, wherein a rear surface of the board is in direct contact with the mounting section of the plate such that the protrusion of the rear surface of the board protrudes through the plurality of holes, wherein the board is a PCB having a circuit pattern, wherein a space defined by the mounting section and the first and second sections of the plate is configured to receive edge portions of a reflective plate and a light guide plate, with the edge portion of the reflective plate positioned between the light guide plate and the second section of the plate, wherein the first and second sections have different lengths, with the second section extending further from the mounting section than the first section does, wherein the mounting section of the plate is physically separated from the reflective plate, wherein the edge portions of the reflective plate and the light guide plate vertically overlap the second section of the plate, wherein the second section contacts an outer facing surface of the edge portion of the reflective plate and is located at a lower position than the outer facing surface of the edge portion of the reflective plate.

16. The light emitting module of claim 15, wherein a distance between the first section and the second section of the metal plate is greater than or equal to a width of the board, wherein a width of the mounting section of the metal plate is greater than or equal to the width of the board.

17. The light emitting module of claim 16, wherein an entire surface of the first section of the metal plate is formed in a flat surface and an entire surface of the second section of the metal plate is formed in a flat surface.

18. The light emitting module of claim 15, wherein the distance between the first section and the second section of the metal plate is greater than or equal to the width of the mounting section of the metal plate.

19. The light emitting module of claim 15, wherein the edge portions of the reflective plate and the light guide plate is vertically overlapped with the second section of the metal plate.

* * * * *